United States Patent [19]

Probert

[11] Patent Number: 5,198,812
[45] Date of Patent: Mar. 30, 1993

[54] AIRCRAFT ATTITUDE INDICATOR DISPLAY

[75] Inventor: Andrew A. Probert, Dayton, Ohio

[73] Assignee: The United States of America as represented by the Secretary of the Air Force, Washington, D.C.

[21] Appl. No.: 846,191

[22] Filed: Mar. 4, 1992

[51] Int. Cl.⁵ .............................................. G01C 23/00
[52] U.S. Cl. ...................................... 340/975; 340/974
[58] Field of Search ............... 340/971, 973, 974, 975, 340/976, 967; 364/434, 424.06; 33/328; 73/178 R; 342/51

[56] References Cited

U.S. PATENT DOCUMENTS

| 3,723,963 | 3/1973 | Hernandez, Jr. | |
| 4,247,843 | 1/1981 | Miller et al. | 340/973 |
| 4,513,509 | 4/1985 | Nordström | 33/330 |
| 4,626,851 | 12/1986 | Tooze | 340/975 |
| 4,878,054 | 10/1989 | Reynaud | 340/975 |
| 4,882,845 | 11/1989 | Boyer | 33/328 |
| 4,903,017 | 2/1990 | Wooller | 340/975 |
| 4,977,401 | 12/1990 | Sjöberg | 340/975 |

Primary Examiner—Jin F. Ng
Assistant Examiner—Brent A. Swarthout
Attorney, Agent, or Firm—Gerald B. Hollins; Donald J. Singer

[57] ABSTRACT

An aircraft attitude display format which maintains the horizon reference line always in view and which presents the pilot with multiple indications of aircraft attitude differing from level flight. The multiple indications include attitude registration along an angular scale and shape change of the horizon reference line. The display format has the appearance of a fish-eye lens derived optical image and is preferably placed in this form by electronic image processing—which is exemplified by an included mathematical discussion and computer code listing software. Provisions for other data display are also disclosed. Use of the display format in a panel instrument or CRT-based system including the HUD configuration are contemplated.

11 Claims, 8 Drawing Sheets

AIRCRAFT ATTITUDE INDICATOR DISPLAY

RIGHTS OF THE GOVERNMENT

The invention described herein may be manufactured and used by or for the Government of the United States for all governmental purposes without the payment of any royalty.

BACKGROUND OF THE INVENTION

This invention relates to the field of aircraft flight instruments and their display arrangement and to display arrangements of this type which are convenient for use with electronic signal processing.

In order to control the flight of an aircraft, a pilot must know the aircraft's attitude with respect to the earth. Under favorable conditions, the pilot may determine this attitude to a degree by visual observation of the aircraft and the earth, however, under many conditions of flight, this visual observation is not possible.

In order to fly aircraft at night or under limited visibility conditions, and in order to know with a degree of precision the attitude of the aircraft with respect to the earth, it has become common practice to determine this attitude with the use of an attitude indicating instrument that is mounted in the aircraft cockpit. Indeed, an attitude indicator is often one of the principal flight control instruments and is usually mounted in a convenient and central cockpit location that is easily accessed by the pilot. Such attitude indicators in the past have taken the form of electromechanical instruments that are based on the pull of gravity, or more desirably, on a gyroscopic stabilized frame of reference. In more modern aircraft, at least the display portion of such instruments is often replaced with an electronic display employing, for example, a cathode ray tube, a light emitting diode matrix or a liquid crystal display assembly.

An undesirable feature of both the directly viewed electromechanical attitude indicator instrument and the more modern electronic displays of attitude information is their usual limitation to a field of view in the range of +30 or +40 degrees to −30 or −40 degrees. By way of this limitation, such displays are incapable of maintaining the artificial horizon in view of the pilot under many conditions of aircraft flight encountered in a high performance aircraft—such as the F-15 and F-16 that are currently used by the U.S. Air Force.

The absence of a horizon representation in the optical image of an aircraft display can also make interpretation of the display more difficult and/or more time consuming for a busy pilot or other aircraft crewmember. Particularly this effect is to be found under conditions of stress as may be induced by G forces, fatigue, hostile flight conditions, enemy activities, or other difficult environments encountered with a high performance aircraft. The display arrangement of the present invention improves upon this horizon absence condition and provides a number of additional advantages which will be apparent as the present disclosure ensues.

The patent art includes several examples of aircraft attitude indicating instruments which are in accordance with the above-described arrangement of such instruments. Included in this art is the patent of Francis Boyer, U.S. Pat. No. 4,882,845, which is concerned with a gyroscopic artificial horizon instrument of the self-contained gyroscope and display type.

Also included in this patent art is the patent of J. M. Reynaud, U.S. Pat. No. 4,878,054, which is concerned with a method and device for representing the horizon in an aircraft instrument and is also an example of an electronic display, including a cathode ray tube that is coupled to a computer-based attitude data processing arrangement.

Also included in this patent art is the U.S. Patent of Lennart Nordstrom, U.S. Pat. No. 4,513,509, which is concerned with an attitude direction indicator of the gyroscope-based type. The Nordstrom apparatus includes a spherical display element that is controlled by the gyroscope and read by the aircraft pilot through the use of an array of apex-inclusive pointer indicia appearing in a portion of the display.

Also included in this art is the patent of Ralph Hernandez Jr., U.S. Pat. No. 3,723,963, which is concerned with an aircraft gyrohorizon indicator with signal lamp positional attitude indicating means. The Hernandez Jr. indicator lamps provide the pilot with a quickly comprehendable indication of the aircraft's departure from straight and level flight by more than some reasonable limits of pitch and bank.

Although each of these prior patents presents aspects of the aircraft indicating instrument art which have been useful in improving the information available to a pilot, none of these patents provides an attitude display indication which is capable of the large angle and unique optical image patterns afforded by the present invention.

SUMMARY OF THE INVENTION

In the present invention, an aircraft attitude display of large attitude range capability and fish's eye algorithm determined characteristics is disclosed. The display of the present invention is particularly useful in maintaining the sky-to-earth-junction horizon representation always available to the pilot and of providing patterns which may be quickly apprehended and easily retained in the pilot's memory for instant interpretation of flight conditions.

It is an object of the present invention, therefore, to provide an aircraft attitude display that is governed by the characteristics of the fish's eye lens.

It is another object of the invention to provide an aircraft attitude display which maintains the horizon indicating portion of the display image always in view regardless of extreme attitudes achieved by the aircraft.

It is another object of the invention to provide an aircraft attitude display which may be readily implemented with electronic display technology.

It is another object of the invention to provide an aircraft attitude display that is well suited to the use of either black and white or color-inclusive optical capabilities in the display apparatus.

It is another object of the invention to provide an aircraft attitude display having a large range of aircraft attitude accommodation.

It is another object of the invention to provide an aircraft attitude display having quickly-discernable indications of aircraft bank or roll axis displacement.

It is another object of the invention to provide an aircraft attitude display in which departure of the aircraft from a level flight condition is indicated by multiple changes in the display appearance.

It is another object of the invention to provide an aircraft attitude display in which the sky-to-earth-junction horizon may depart from the conventional straight line representation in response to the aircraft's achieving a nose-up or nose-down attitude.

It is another object of the invention to provide an aircraft attitude display in which both a curving horizon indication and a physical displacement of the horizon indication along an angular indicating scale combine to represent nose-up or nose-down attitudes of the aircraft.

It is another object of the invention to provide an aircraft attitude display in which optically contrasting image representations serve to enhance quick comprehension of aircraft attitude.

Additional objects and features of the invention will be understood from the following description and claims and from the accompanying drawings.

These and other objects of the invention are achieved by electronic attitude display apparatus for an aircraft comprising the combination of electrically operated blank screen means for generating a plurality of human viewable optically contrasting images, means for representing the aircraft as a first predetermined optical image symbol on the blank screen means, and means for representing the sky-to-earth-junction horizon by a second predetermined optical image symbol, a symbol that is shapewise responsive to the attitude of the aircraft and viewable in conjunction with the first optical image symbol or the blank screen means.

DETAILED DESCRIPTION

Figure 1:
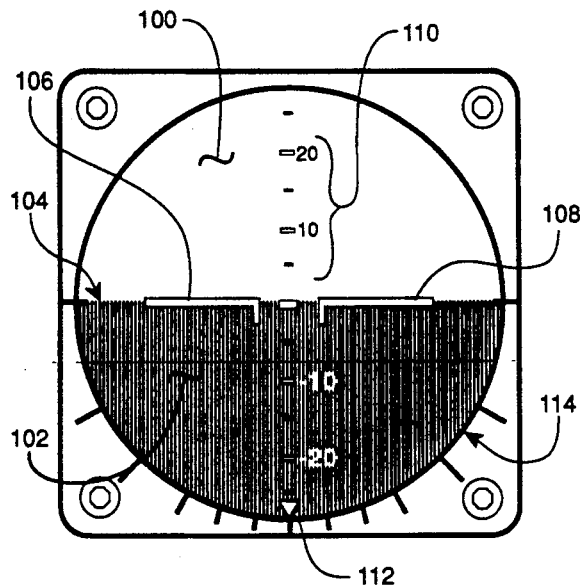
FIG. 1 shows a conventional aircraft attitude display format under conditions of level flight.

FIGS. 1-4 in the drawings show the electronic attitude indicator display format used in the F-15E fighter aircraft, a new fighter aircraft in the U.S. Air Force's inventory, during several attitude examples. In the FIG. 1 display format, the lightly colored region 100 represents the sky, the darker colored or shaded region 102 represents the earth, and the straight line 104 represents the sky-to-earth junction, or the horizon. The line 104 normally serves as the pilot's primary reference for the attitude of the aircraft in which the FIG. 1 instrument is mounted. The symbols 106 and 108 in the FIG. 1 display format represent the left and right wings of the mounting or host aircraft and the numeric scale 110 provides a measure of angular departure from a centermost scale position or a 0° attitude of the aircraft. Also shown in the FIG. 1 display format is a triangular-shaped pointer 112 which, in conjunction with the graduated angular scale 114, indicates the roll axis or bank attitude of the host aircraft.

The information shown by the instrument of the FIG. 1 format indicates the host aircraft to be in a condition of wings level, horizontal flight. This attitude is indicated by positioning of the horizon line 104 at the 0° mark along the scale 110, and by the parallel condition of the wing symbols 106 and 108 with the horizon indicating line 104.

The FIG. 1 display format may be said to include a +30° to −30° or 60° field of view. Notably, however, whenever the aircraft mounting an instrument of the FIG. 1 display format achieves a posture of 30° or more in the nose-up or nose-down attitude, the horizon indicating line 104 will be excluded from view in the FIG. 1 indicating format. A condition of this nature is represented in the FIG. 4 drawing, where the aircraft mounting the instrument is presumed to be in a 30° nose-high attitude. As is also indicated in FIG. 4, the numeric scale 110 shown in FIG. 1 is not necessarily limited to angular values of 30° and may extend to values of 40, 50, or some other range. The all-important horizon indication is, however, excluded from the FIGS. 1-4 display format for attitudes in excess of ±30°.

The triangular-shaped pointer 112 in the FIGS. 1-4 display format is often referred to as a ground pointer in addition to its function as a bank angle or roll axis displacement indicator.

Figure 2:
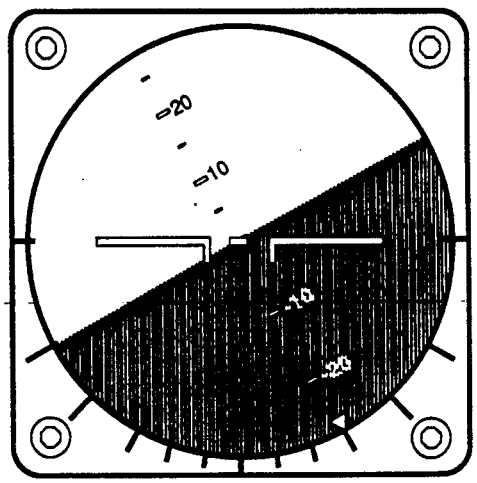
FIG. 2 shows the FIG. 1 display under conditions of 30° right bank of the aircraft.
Figure 3:
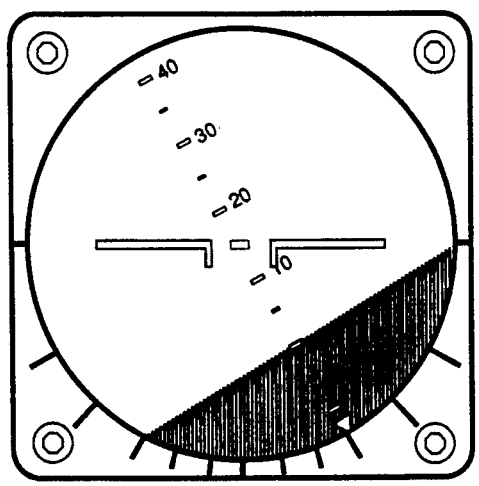
FIG. 3 shows the FIG. 1 display under conditions of 15° nose up and 30° right bank.
Figure 4:
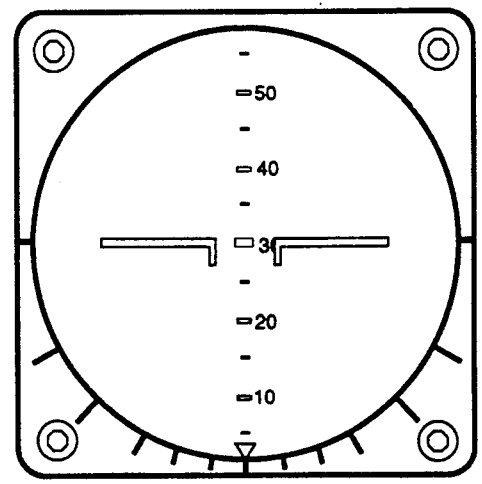
FIG. 4 shows the FIG. 1 display under conditions of 30° nose high flight.

FIGS. 2 and 3 of the drawings show the appearance of the FIG. 1 type of display format under conditions of combined roll and bank. The FIG. 2 drawing indicates an attitude of 30° right bank during level flight, and the FIG. 3 drawing indicates a 15° nose-up and 30° right bank attitude of the aircraft. The FIGS. 1-4 display format may be used in either an instrument panel mounted attitude indicator or in a head up display (HUD).

The absence of an ever-present view of the horizon, especially when the aircraft is in extreme attitudes and the pilot is confronted with rapidly-moving and potentially confusing scale indications, is an underlying disadvantage of the FIGS. 1-4 conventional display image arrangement. Particularly where the aircraft mounting the FIGS. 1-4 display is maneuvering or undergoing high rates of pitch and bank angle change is the absence of a horizon representation and the need to rely on numeric and other slowly comprehended clues a significant disadvantage. In fact the absence of a horizon indication can alone result in spatial disorientation, loss of control and possibly result in collision of the aircraft with another aircraft or with the ground under such complex flight conditions.

It may be possible to provide the desired ever-present horizon indication in a display format of the FIGS. 1-4 type merely by compressing the angular scale so that, in FIG. 1, for example, the numeric scale 110 includes the range of 0° to +90° above the horizon and 0° to −90° below the horizon. This arrangement is less than satisfactory, however, in that a desired degree of attitude resolution not therein possible. With such an arrangement it is difficult for a pilot to discern the difference between a 15° and 16° nose-up attitude of the aircraft, for example.

FIGS. 5-22 in the drawings show a display format according to the invention which overcomes difficulties presented by the FIGS. 1-4 format. The elements comprising the FIGS. 5-22 format optical images are identified in FIG. 5 with numbers in the 500 series. To the greatest degree possible, these numbers correspond to the similar number identifications in FIG. 1, except for the highest order digits being in the 500 and 100 number series, respectively.

Figure 5:
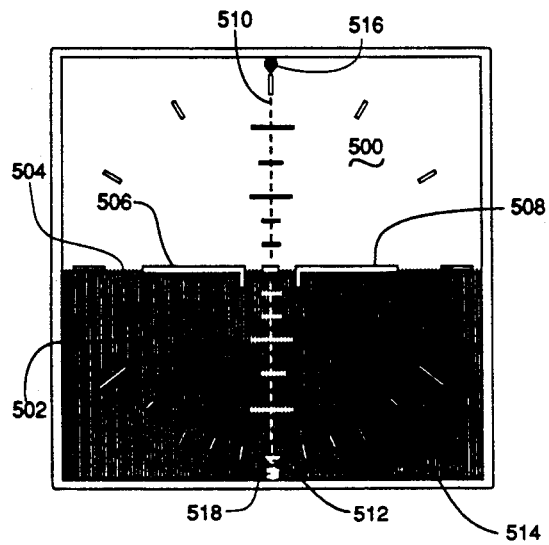
FIG. 5 shows an improved aircraft attitude display according to the invention under conditions of wings level, horizontal flight.

In the FIG. 5 format image, the number 500 indicates the sky, the number 502 the earth, the number 504 the horizon, and the numbers 506 and 508 the left and right wings of the aircraft. In similar manner, the number 510 in FIG. 5 indicates the pitch attitude measurement scale or the "vertical" line, the number 514 the roll axis angular measurement scale, and the number 512 the triangular shaped pointer for the roll axis scale 514. The pointer 512 again serves as a ground pointer in the FIG. 5 format. Also shown in the FIG. 5 display format are large dots at either end of the pitch attitude measurement scale or the "vertical" line. These dots indicate 90° straight up (zenith), dot 516, and 90° straight down (nadir), dot 518. As indicated by the numbers and graduations along the scale 510, the aircraft in which the illustrated display format 15 is mounted is flying in a wings level, nose horizontal attitude.

It is notable that the FIG. 5 display format includes 180° ranges of angular displacement or field of view, across the center of the display both vertically and horizontally. The FIG. 5 format also has a diagonal angular measurement range of 254°. The latter 254° value is of course, verifiable as the square root of the sum of the squares of the two 180° ranges. The relatively large angular measurement capacity, the 180°-254° capacity in the FIG. 5 display format, is effective in maintaining the horizon in view regardless of the aircraft's attitude when the display is operated according to the fish-eye concept described below.

Figure 6:
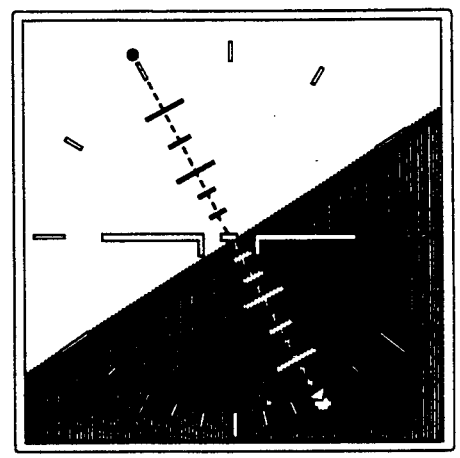
FIG. 6 shows the FIG. 5 display during 30° right bank by the aircraft.

FIG. 6 shows the FIG. 5 display when the mounting or host aircraft is performing a 30° right bank maneuver wherein the right wing is low and pointed to the earth and the left wing is pointed into the sky. As observed in FIG. 6, these pointings are readily identified with the light and dark backgrounds of the display format, just as was the condition in the FIGS. 1-4 display.

Figure 7:
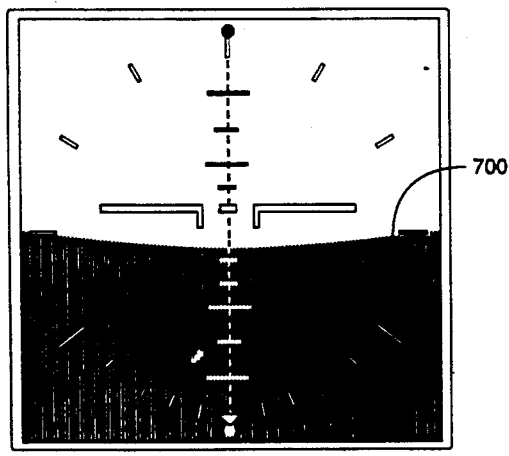
FIG. 7 shows the FIG. 5 display during 10° nose up flight by the aircraft.
Figure 18:
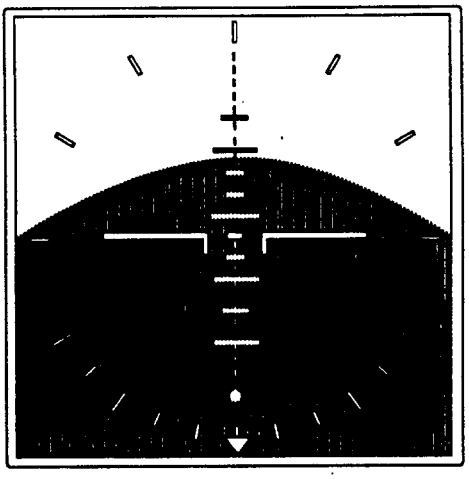
FIG. 18 shows the FIG. 5 display during 30° nose down flight by the aircraft.
Figure 19:
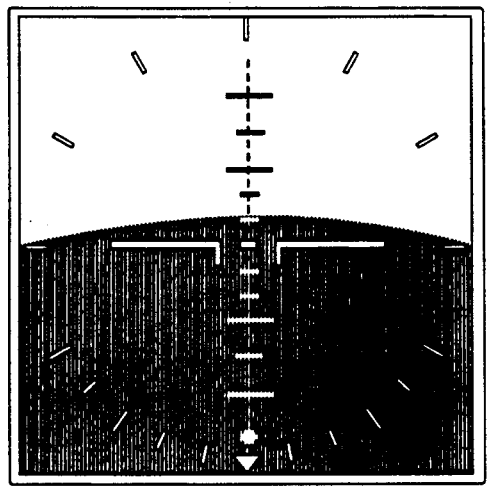
FIG. 19 shows the FIG. 5 display during 10° nose down flight by the aircraft.

The figures commencing with FIG. 7 and ending with FIG. 18 of the drawings show the FIG. 5 display as it would appear when the hosting aircraft is performing a loop maneuver. FIG. 7 shows the appearance of the FIG. 5 display just after starting this loop maneuver with the aircraft being in a 10° nose-up condition. FIGS. 8-18 show the FIG. 5 display as it would appear when the aircraft attains the positions of 30° nose-up and at 30-degree increments thereafter in the loop maneuver. FIG. 19 shows the attitude indicator appearance just prior to completion of the loop maneuver, when the aircraft is in a 10° nose-down attitude.

Figure 8:
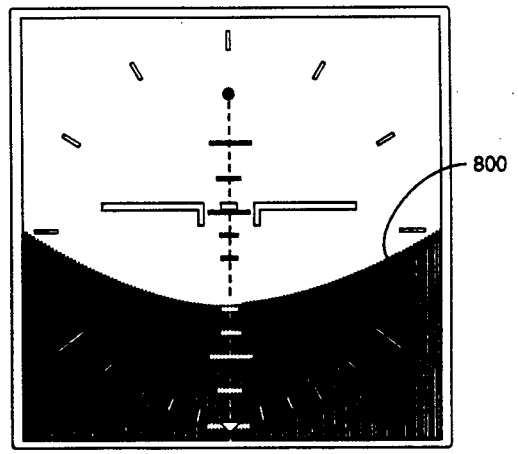
FIG. 8 shows the FIG. 5 display during 30° nose up flight by the aircraft.

A striking difference between the FIGS. 1-4 display format and the FIGS. 5-22 display format is illustrated by the horizon indicating line 700 in the FIG. 7 drawing. In each of the FIGS. 1-4 representations, the horizon indication remains a straight line, regardless of the attitude of the aircraft with respect to the earth. As is shown by of the line 700 however, in the present invention display format, once the aircraft leaves the horizontal attitude and becomes either nose-up or nose-down, the horizon indicating line becomes curved. Moreover, as is illustrated by the views of FIGS. 8 and 9, the degree of this curvature is related to the degree of displacement of the aircraft from the straight and level or horizontal attitude.

By way of this combined curvature and change of curvature representation of the horizon in the FIG. 5-FIG. 22 display format, an aircraft pilot is provided with an additional and quickly recognizable indication of the degree of nose-up or nose-down attitude of the host aircraft. Such communication by way of image shapes or other gross changes in a visual pattern has long been recognized as both a speed enhancement and a more reliable means of information transmission—especially to a person who is distracted or otherwise in less than a fully cognitive state. The combination of a varying degree of curvature in the horizon indication and a precise measurement of the degree of attitude displacement along the scale 510 in FIG. 5 therefore comprise, in fact, a significant improvement in communicating information to an aircraft pilot.

Figure 9:
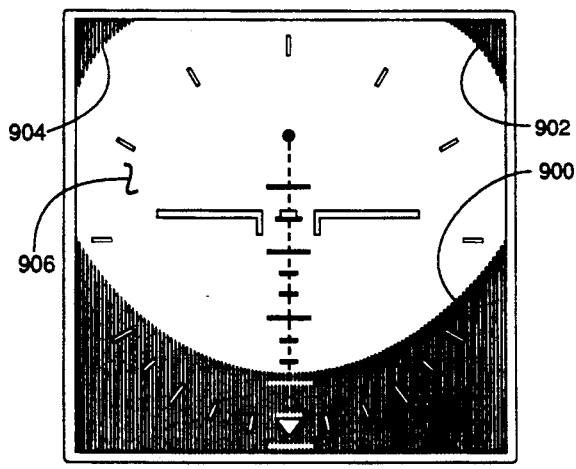
FIG. 9 shows the FIG. 5 display during 60° nose up flight by the aircraft.
Figure 10:
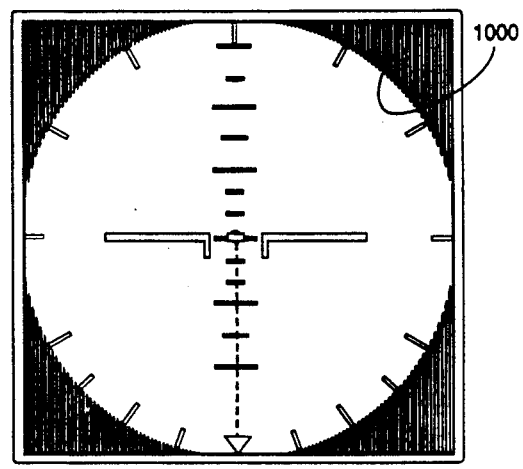
FIG. 10 shows the FIG. 5 display during 90° nose up flight by the aircraft.
Figure 11:
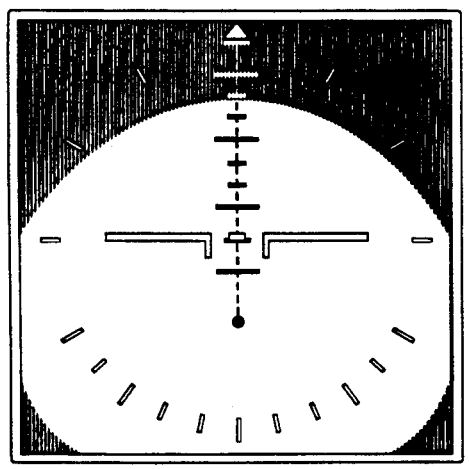
FIG. 11 shows the FIG. 5 display during aircraft inverted and 60° nose up flight by the aircraft.
Figure 12:
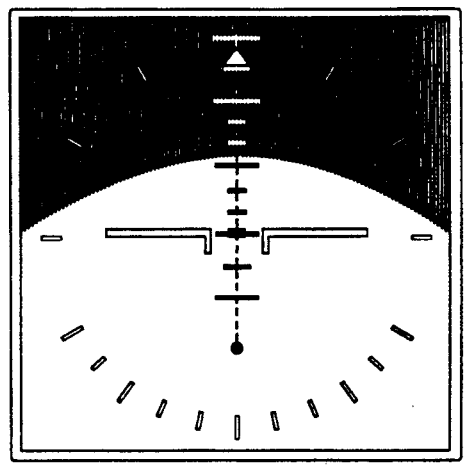
FIG. 12 shows the FIG. 5 display during aircraft inverted and 30° nose up flight by the aircraft.
Figure 13:
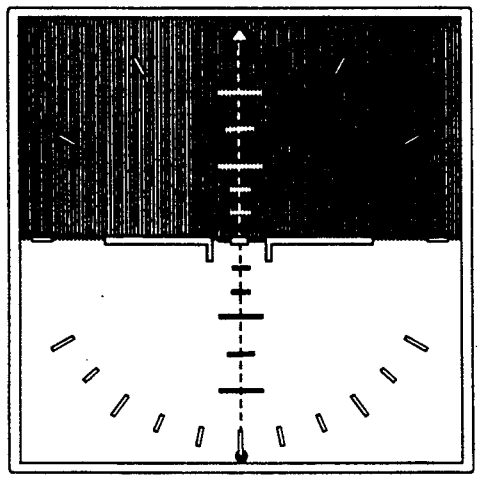
FIG. 13 shows the FIG. 5 display during aircraft inverted and level flight by the aircraft.

As is illustrated in FIGS. 9-11 of the drawings, the curving horizon indication of the present invention progresses into a full circular representation at more extreme values of aircraft attitude. In FIG. 9, where the sky is represented at 906, the horizon indication 900 has achieved a curvature degree which results in portions of the horizon appearing in the upper parts of the display image at 902 and 904, for example. The nature of this full-circle representation becomes fully apparent in the horizon indication 1000 in FIG. 10 of the drawings.

Figure 14:
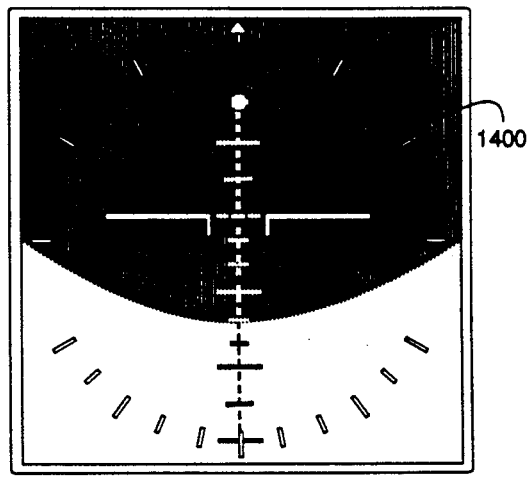
FIG. 14 shows the FIG. 5 display during aircraft inverted and 30° nose down flight by the aircraft.
Figure 15:
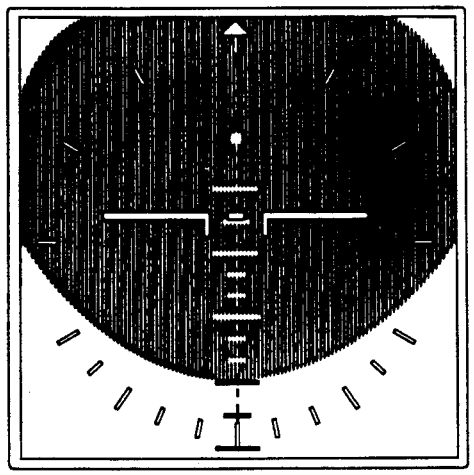
FIG. 15 shows the FIG. 5 display during aircraft inverted and 60° nose down flight by the aircraft.
Figure 16:
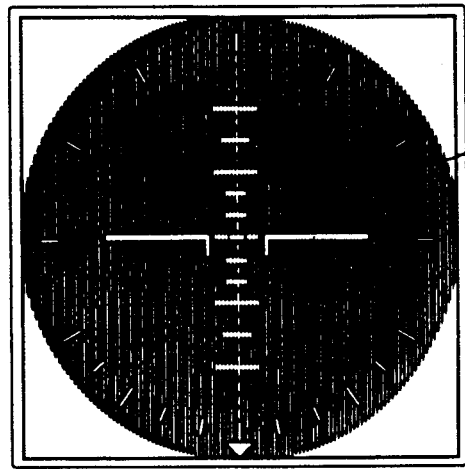
FIG. 16 shows the FIG. 5 display during 90° nose down flight by the aircraft.
Figure 17:
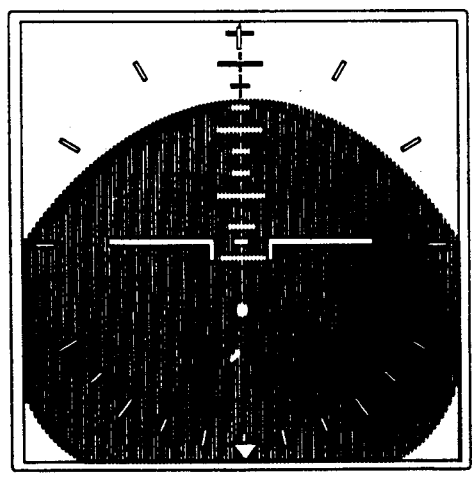
FIG. 17 shows the FIG. 5 display during 60° nose down flight by the aircraft.

As is illustrated especially in FIGS. 14-16, the nose-down attitude of the host aircraft is easily recognized in the present display format by way of the uppermost shaded or differently-colored portion of the display. In this attitude, the internal area of the horizon circle is shown as shaded in the manner of the earth portion 502 of the FIG. 5 display format. The relative ease with which the pilot can distinguish the nose-up and nose-down attitudes (if such distinction is ever in fact, necessary by way of an instrument), can be appreciated by a comparison of the optical images in FIGS. 10 and 16.

Figure 20:
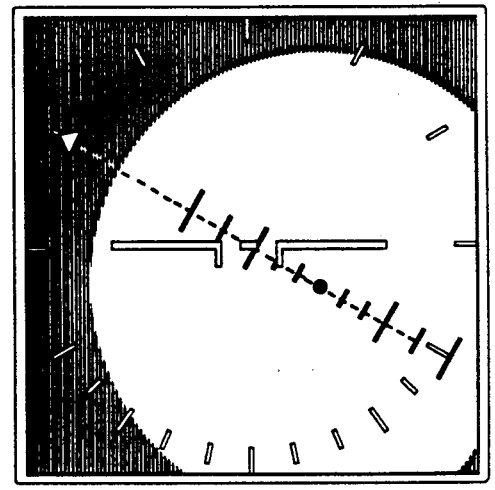
FIG. 20 shows the FIG. 5 display during 59° nose up, and 120° left bank flight by the aircraft.
Figure 21:
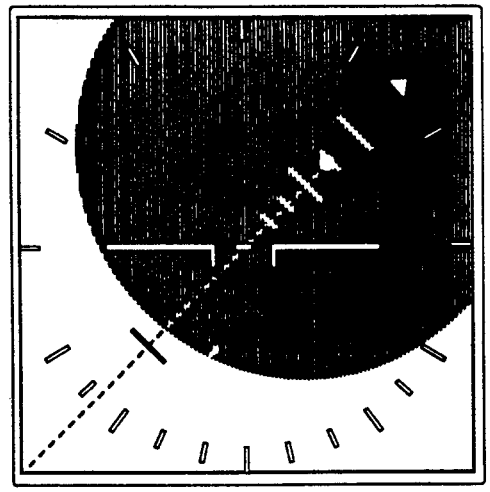
FIG. 21 shows the FIG. 5 display during 45° nose down, and 135° right bank flight by the aircraft.
Figure 22:
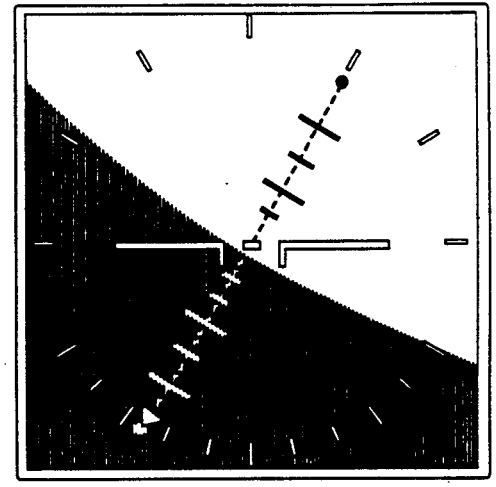
FIG. 22 shows the FIG. 5 display during 5° nose up, and 30° left bank flight by the aircraft.

FIGS. 20-22 of the drawings show the appearance of a display according to the present invention in the presence of several degrees of nose-up and nose-down attitude in combination with the presence of right and left banking maneuvers of the host aircraft. In interpreting the display images of FIGS. 20-22, it may be appreciated that the "vertical" line (510) extends in each instance through the nose of the aircraft perpendicular to the horizon and intersects the horizon where the angle from the nose to the horizon is the smallest.

This indication of the direction to the closest horizon as is represented by the vertical line, 510, is a critical quantum of information for a pilot desiring to recover from a dangerous nose-low attitude, as is represented in FIG. 21, while using a minimum of altitude to accomplish the recovery. In this instance the pilot needs to roll 135° to the left as rapidly as possible in order to put the vertical line perpendicular to his wings with the sky at the top of the display and then pull the nose up to the horizon. Having the sky in view at all times as is characteristic of the present display format, versus having only a tiny pointer of the type indicated at 112 in FIG. 1, simplifies the pilot's task in recognizing which direction is up and helps the pilot avoid inadvertently pulling his aircraft into the ground. This, of course, represents another significant advantage of the present invention display format.

The absence of the horizon in the attitude display format of FIG. 4 and the presence of this horizon in the similar display format of FIG. 8 is of course a significantly improved principal aspect of the present invention display format.

The sky and earth portions of the display format shown in FIG. 5 may be represented as different shades of gray or different crosshatchings in a black and white display arrangement. The use of a blank field derived color raster or color capable field for the display is preferred, however. The modern practice in aircraft instrumentation displays is of course to utilize the three-gun coloring or otherwise arranged cathode ray tube for presenting a wide range of information to a pilot. This information may include aircraft flight instrumentation, as in the present instance, and may also include navigation and weapons systems information, for examples. Alternately, a color liquid crystal display, a color matrix of light emitting diodes or even color segregated fiber optic array bundles may be used in presenting these color coded information quantums to a pilot or other aircraft crewmember. Generically speaking, gray scales and color attributes may be described in terms of color attributes of hue, saturation and intensity. In the color display example, such variations are capable of representing any known optically contrasting image portions.

In the FIG. 5 display format it may be desirable for example, to use a blue coloration for the sky 500 and a brown coloration for the earth 502 and to present the angular scale 510 in a contrasting color such as black or red. Other colors and other combinations of colors may of course be selected by users of the invention.

A detailed consideration of FIGS. 5-22 may arrive at the conclusion that the present display format responds to input data in the same manner as a fish's eye lens of the type used for certain photographic and security surveillance purposes. The presence of a fish's eye optical element is of course not necessary in order to achieve this display format, and the necessary signal modifications may be accomplished with mathematical manipulation of image features as can be accomplished by electronic circuitry. The electronic processing of display information is a convenient arrangement especially when the colors referred to above and a cathode ray tube display are to be employed. An example of accomplishing this information processing with the use of computer software is presented in the computer program appendix portion of the present patent document.

Figure 23:
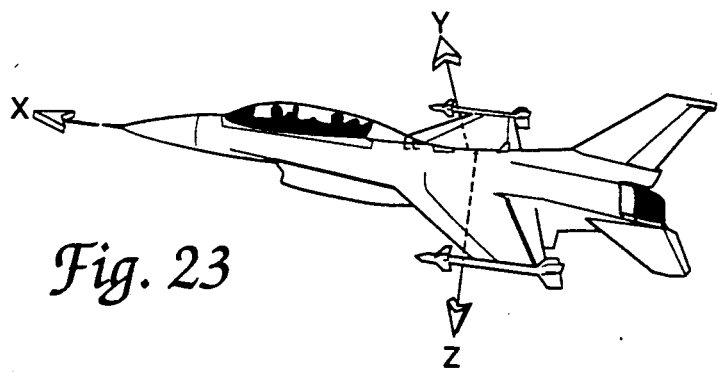
FIG. 23 shows an airframe fixed coordinate axis system.

As a basis for considering computerized mathematical processing of signal information used in the FIGS. 5-22 display format, the following mathematical considerations together with the coordinate axes set displayed in FIG. 23 of the drawings may be considered.

To describe the attitude of an aircraft, an airframe fixed coordinate system as shown in FIG. 23 may be used. The FIG. 23 vectors x, y and z form a set of orthogonal unit vectors wherein x is aligned with the aircraft fuselage reference line in the forward direction (the longitudinal axis), y is aligned with the lateral axis in the direction of the right wing, and z is aligned with the vertical (yaw) axis in the direction downward out of the aircraft.

Three angles therefore describe the orientation, or attitude of an aircraft with respect to the earth; these angles are concisely known as heading, pitch, and bank. Heading is generally the compass direction of the aircraft nose, pitch is the angle between the x axis and the horizontal plane, measured positive up, and bank is the angle between the y axis and the horizontal plane measured positive down (right bank is positive). In the description herein for the initial reference attitude, all angles are zero, and the aircraft is level, pointing north. Vectors herein are represented by boldface symbols.

An array of 38 inertially fixed vectors of unit length may be defined as horizon A vectors in order to achieve initial numerical values for 36 vectors which will define the horizon location and 2 vectors which will define the zenith and the nadir locations.

$$A_{hi} (i = 1, 2, 3, \ldots, 38) \tag{1}$$

where A denotes the reference attitude. The symbol "h" denotes a 3-dimensional vector. The first 36 vectors relating to (1) point to the horizon at 10 degree intervals from 10 through 360 degrees of heading. $A_{h37}$ points straight down, and is called the nadir vector. $A_{h38}$ points straight up, and is called the zenith vector.

Each of the 38 vectors has components in the x, y, and z directions:

$$A_{hi} = [A_{xi} \, A_{yi} \, A_{zi}] (i = 1, 2, 3, \ldots, 38). \tag{2}$$

In the reference attitude, with heading, pitch, and bank all of zero value, the horizon vector array numerical values are:

$$\begin{aligned} A_{h1} &= [\cos 10° \; \sin 10° \; 0] \\ A_{h2} &= [\cos 20° \; \sin 20° \; 0] \end{aligned} \tag{3}$$

$$\begin{aligned} A_{h36} &= [\cos 360° \; \sin 360° \; 0] \\ A_{h37} &= [0 \quad 0 \quad 1] \\ A_{h38} &= [0 \quad 0 \; -1] \end{aligned} \begin{aligned} (4) \\ (5) \end{aligned}$$

Figure 24:
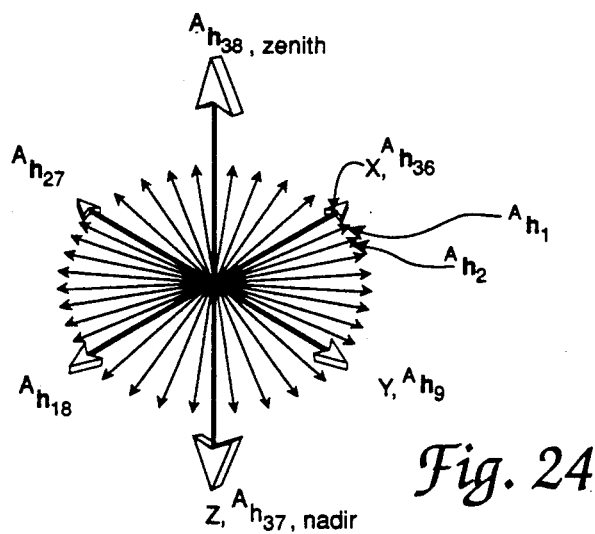
FIG. 24 shows the horizon vector array with the aircraft in the reference attitude of straight and level flight, heading north.

All the vectors are shown in FIG. 24. To describe the position of the horizon vector array when the angles of heading, pitch, and bank are not all zero, the angles of heading, pitch, and bank are used as Euler angles for successive rotations of the airframe-fixed frame of vectors with respect to the earth. Rotating each of the horizon vectors; first, about the z axis by the heading angle; secondly, about the y axis by the pitch angle; and thirdly, about the x axis by the bank angle will yield a new vector set called horizon B vectors:

$$B_{hi} (i=1, 2, 3, \ldots, 38). \tag{6}$$

The horizon B vector array for describing the attitude of the aircraft, is formed by multiplying each vector in horizon A by a transformation matrix, C.

$$B_{hi} = A_{hi} C \ (i=1, 2, 3, \ldots, 38) \tag{7}$$

Let heading = h, pitch = p, and bank = b. Also, let cosine be represented by c, and sine by s, for brevity, then the transformation matrix C is:

$$\begin{bmatrix} chcp & chspsb - cbsh & chspcb + sbsh \\ shcp & shspsb + cbch & shspcb - sbch \\ -sp & cpsb & cpcb \end{bmatrix} \tag{8}$$

Performing the matrix arithmetic yields:

$$B_{xi} = A_{xi} chcp + A_{yi} shcp - A_{zi} sp \tag{9}$$

$$B_{yi} = A_{xi}(chspsb - cbsh) + A_{yi}(shspsb + cbch) + A_{zi} cpsb \tag{10}$$

$$B_{zi} = A_{xi}(chsps + cbsh) + A_{yi}(shspsb - cbch) + A_{xi} cpsb \tag{11}$$

Figure 25:
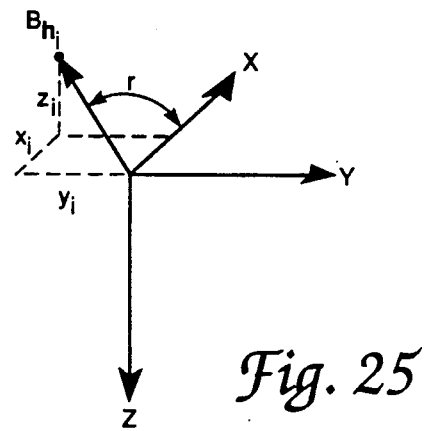
FIG. 25 shows the angle r.

The resulting array of vectors numerically defines where the horizon is with respect to the aircraft at the given heading, pitch, and bank. These are 3-D vectors. However, the cockpit display is a 2-D apparatus. The vectors are, however, all of unit length, and can be described by two angles r and $\gamma$ (the angle r is shown in FIG. 25). $r_i$ is the angle between the horizon vector $B_{hi}$ and the x axis. In terms of the vector dot product:

$$r_i = arccos(B_{hi} \cdot x) \tag{12}$$

Since both vectors are of unit length, $$B_{hi} \cdot x = B_{xi}, \tag{13}$$

and so:

$$r_i = arccos \ B_{xi}. \ (0 \leq r_i \leq 180 \ deg). \tag{14}$$

$\gamma_i$ is the angle between the projection of $B_{hi}$ into the y-z plane and the y axis, measured positive toward z.

$$\gamma_i = arctan \ (B_{zi}/B_{yi}). \tag{15}$$

Figure 26:
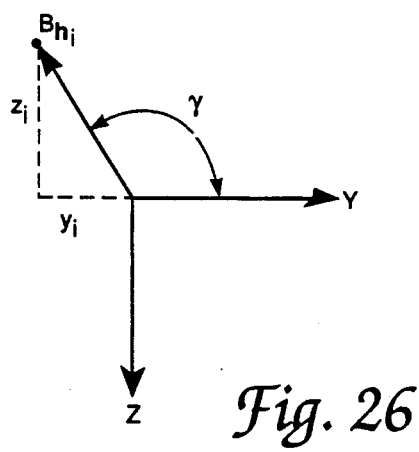
FIG. 26 shows the angle $\gamma$.

The quadrant under consideraton is important with respect to the angle $\gamma_i$. The angle $\gamma$ as shown in FIG. 26 is approximately $-120°$, or $+240°$.

Figure 27:
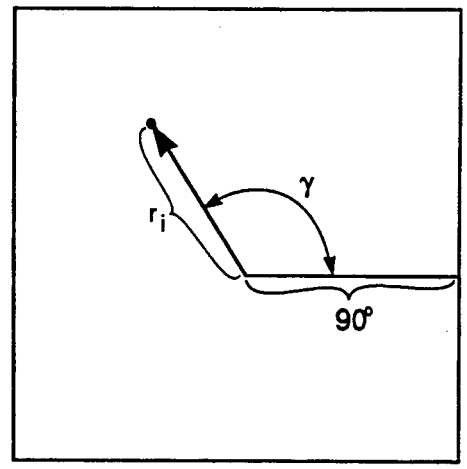
FIG. 27 shows angles r and $\gamma$ in polar coordinate form on a display screen.

$r_i$ and $\gamma_i$ are used as polar coordinates to plot the location of the horizon on the display. FIG. 27 shows the angles r and $\gamma$ in polar coordinate form on a display screen with an $r_i$ value of about 60°, and a $\gamma_i$ value of about $-.120°$.

In using the FIGS. 24–27 concepts, the 36 points as defined by $r_i$ and $\gamma_i$ (i=1, 2, ..., 36) are connected with a line to draw the horizon line. Points 37 and 38 are plotted to show the zenith (straight up) and the nadir (straight down).

Since computer graphics generally do not accommodate polar coordinates, the $r_i$ and $\gamma_i$ ordered pairs are preferably translated into a Cartesian coordinate frame, a form a computer can use. An array of two-dimensional vectors called "screen$_i$" may be used to hold the viewport coordinates of the horizon vectors. The task of converting to screen coordinates and the remaining tasks of drawing a picture such as the views of FIGS. 1–22 herein are programming exercises which are dependent on the particular hardware and software used, as is known in the art.

One unusal aspect arises in this exercise, however, when the horizon would appear directly behind the aircraft, i.e., when $B_{xi}$ is near 1.0; here the computer may attempt to connect the dots by drawing an extraneous line across the screen. To avoid this, the software should suppress drawing the horizon line when the horizon line is far off the screen. The entire computer process can be repeated very fast in order for the attitude indicator to appear to be moving smoothly.

Figure 28:
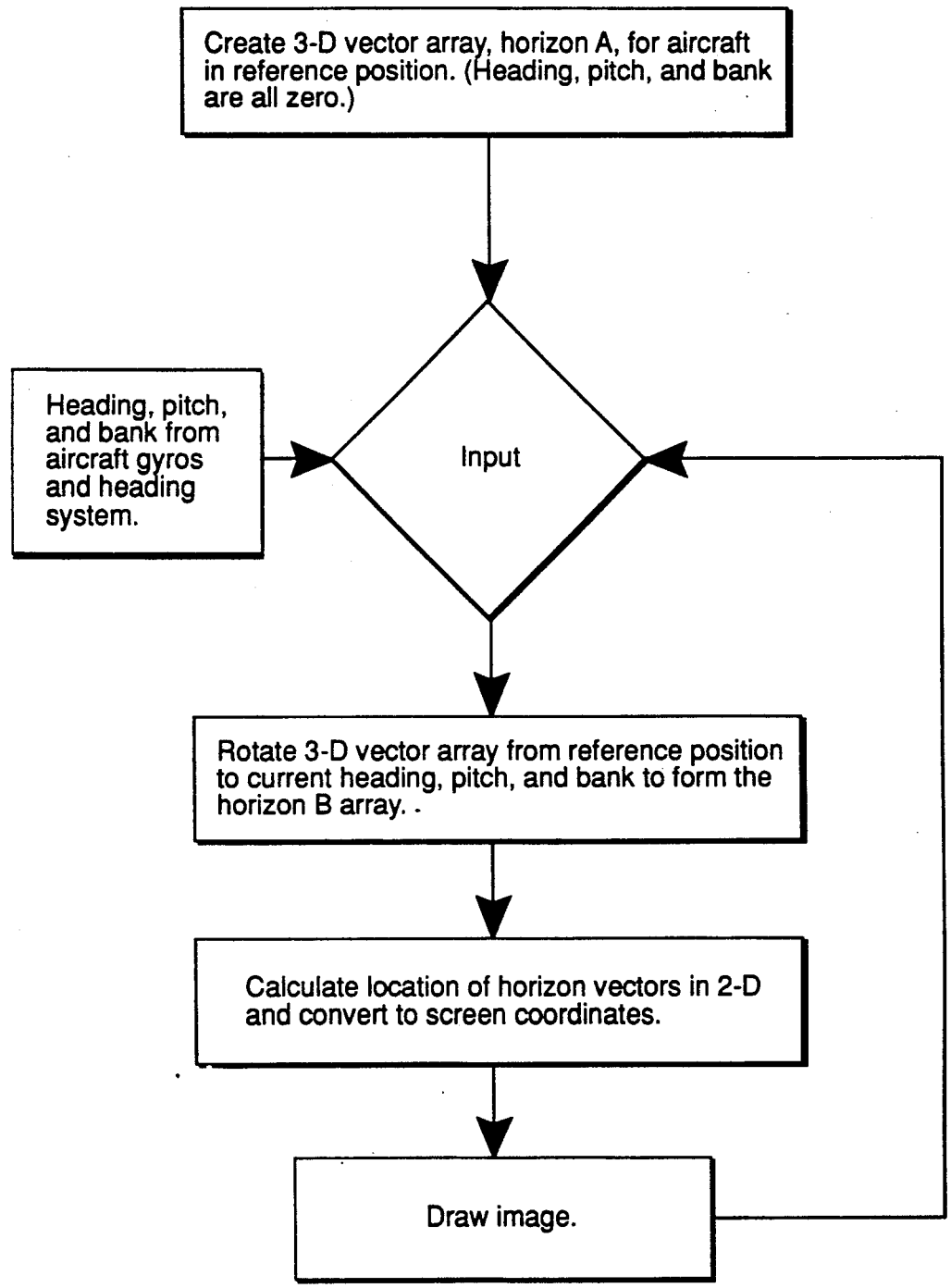
FIG. 28 shows a flow diagram for a computer simulation of the FIGS. 5-22 display arrangement.

A summary of the logical process accomplished in the computer and in the appended program listing is shown in the FIG. 28 flowchart. The appended FIG. 28 related computer code is written in the Turbo Pascal language and may be "run" with the MS DOS operating system on any IBM compatible personal computer. The name Turbo Pascal is protected by intellectual property rights owned by Borland International Inc. of Scotts Valley Calif., USA 95067-0001. Annotations, headings and paragraphing are included in the code listing to enable ready comprehension by readers skilled in the computer art.

Alternate arrangement embodiments of the fish-eye display invention could involve incorporating additional other information in the display. Such information could include a heading scale along the horizon, and the aircraft's velocity vector in the form of a flight path marker; this information is now displayed on head up displays (HUDs). As a result of the relatively small field of view in a HUD, an aircraft capable of high angle of attack and high slidelip maneuvering may lose the flight path marker from the HUD, however, this will not occur with the present invention fish-eye display format.

The inclusion of steering commands from the flight director computer could qualify the present display instrument as an Electronic Attitude Director Indicator (EADI). Other displayed information may also include radar targets and search patterns, infrared search and track set targets and search patterns, threat missile locations, ground target locations, or weapon aiming points. A second fish-eye display for a rear perspective view could also be of significant value.

The aircraft fish-eye electronic attitude indicator display therefore principally informs the pilot of a highly maneuverable aircraft of what the aircraft s attitude is with respect to the earth and the horizon regardless of aircraft attitude. The instrument's representation of the earth and the horizon are always in view, no matter how extreme the attitude of the aircraft. Should the pilot find himself him or herself in an unusual attitude, or become spatially disoriented, the image provided by the display will provide intuitive, easily interpreted information which will enable recovery of the aircraft to level flight or the regaining of spatial orientation in minimum time.

While the apparatus and method herein described constitute a preferred embodiment of the invention, it is to be understood that the invention is not limited to this precise form of apparatus or method and that changes may be made therein without departing from the scope of the invention which is defined in the appended claims.

APPENDIX - Computer Program Listing

```
program EAI_172    {This program, written by Andrew Probert, WL/KTA, will generate
                    a moving attitude indicator display for a tactical aircraft. Use the
                    arrow keys for movement. The advantage of this display over other
                    current displays is that there is always horizon in view, giving the
                    pilot immediate guidance for unusual attitude recovery from extreme
                    attitudes.} uses Graph,Crt,Dos;    {With drag.} type
        coordIndex    = (u,v);
        vectorIndex   = (x,y,z);
        vector        = array[x..z] of real;
        horizon       = array[1..38] of vector;
        coord         = array[u..v] of integer;
        screentype    = array[1..38] of coord;
        realarray     = array[1..38] of real;
var
        horizonA,    { HorizonA is the array of horizon vectors in straight and level
                       flight. This array is rotated in pitch and bank using a coordinate
                       transformation into HorizonB.}
        horizonB : horizon;
        screen  :    screentype;  {screen is the array of horizon vectors
                                    converted to viewport coordinates.}
        GraphDriver,
        GraphMode,
        ErrorCode,
        bank,         {Bank in integer degrees.}
        centerx,      {Center of viewport.}
        centery,
        i,j,
        thirtydeg,
        fortyfivedeg,
        sixtydeg,
        seventydeg,
        eightydeg : integer;
        xside,        {Dimensions of viewport.}
        yside,
        scale,        {Scale must be between 0.0 and 1.0. Is size of port.}
        tendegrees,
        fivedegrees,
        twentydeg,    {Distance along horizontal axis equiv. to corresp. angle.}
        heading,
        pitch,
```

```
    bankr,              {Bank in real radians}
        elevator,
        aileron,yaw,
        cospc,pc,
        cosbc,bc
        cosyc,
        speed,
        ASnew,ASold,
        VS,deltatime,
        ALT,
        Vg,nosedrop,
        nosedrop_y,
        nosedrop_z,
        drag:           : real;
        r, gamma        : realarray;
        visualpage,
        activepage,
        xasp,yasp,
        maxx,maxy,
        ulx,uly,        {Viewpoint coordinates.}
        lrx,lry,
        starthour,
        startminute,
        startsecond,
        startsec100,
        hour,
        minute,
        second,
        sec100,
        counter,
        starttime,
        time,
        time_old,
        time_new        : word;
        ch              : char;
        flag,quit       : boolean;
        numstr          : array[1..12] of string[2];
        airspeed,
        altitude,
        verticalvel     : string[5];

{$I trig.inc} {File of functions: rad to deg, deg to rad, arccos, arcsin} function    IntToStr(i:integer):string; {Convert integer to string.}
            var
                s : string[3];
            begin str(i,s);
            IntToStr := x;
            end;

begin

{Input initial flight parameters.} writeln('Enter "q" to quit.  Press "Enter" to start now.');
```

```
readln;
{
write('Initial heading? ');
readln(heading);
write('Initial pitch? ');
readln(pitch);
write('Initial bank? ');
readln(bankr);
write('Display scale ratio to screen size? ');
readln(scale);
}
heading := 0.0;
pitch := 0.0;
bankr := 0.0;
scale := 0.6;
elevator := 0.0544162;
aileron := 0.0;
ASnew := 591.15;
ALT := 10000.0;

{Convert to radians.} heading := rad(heading);
pitch := rad(pitch);
bankr := rad(bankr);

{Put in graphics mode and check system}

GraphDriver := Detect;
InitGraph(GraphDriver,GraphMode,'C:\Turbo');
ErrorCode := GraphResult;
if    ErrorCode <> grOK then
      begin
      writeln('Graphics Error: ',GraphErrorMsg(ErrorCode));
      writeln('Program aborted ...');
      halt(1);
      end;

{Set variables} getaspectratio(xasp,yasp);
maxx := getmaxx;
maxy := getmaxy;
yside := maxy*scale;
xside := (yasp/xasp)*yside
centerx := round((yasp/xasp)*yside/2);
centery := round(maxy*scale/2);
ulx := round((maxx - xside)/2);
uly := round((maxy - yside)/2);
lrx := round(ulx + xside);
lry := round(uly + yside);
tendegrees := (xside/18);
fivedegrees := (xside/36);
twentydeg := 2*tendegrees;
thirtydeg := round(3*tendegrees);
fortyfivedeg := round(4.5*tendegrees);
sixtydeg := round(6*tendegrees);
```

```
seventydeg := round(7*tendegrees);
eightydeg := round(8*tendegrees);
for  i := 1 to 12 do
     begin
     j := 3*i;
     numstr[i] := IntToStr(j);
     end;
counter := 0;

{Draw viewport frames for both pages and set graphics
      attributes} setvisualpage(0);
setactivepage(0);
cleardevice;
setColor(white);
setlinestyle(solidln,0,thickwidth);
setfillstyle(solidfill,blue);
floodfill(0,0,blue);
rectangle(ulx-1,uly-1,lrx+1,lry+1);
visualpage := 0;
activepage := 1;
flag := true;
quit := false;
setBkColor(lightgray);
settextjustify(centertext,bottomtext);
setViewPort(ulx,uly,lrx,lyr,clipon);

{Initialize the nadir and zenith (down and up) vectors to
      straight and level.} horizonA[37][x] := 0.0;    { Nadir vector. }
horizonA[37][y] := 0.0;
horizonA[37][z] := 1.0;
horizonA[38][x] := 0.0;    { Zenith vector. }
horizonA[38][y] := 0.0;
horizonA[38][z] := -1.0;

{Initialize horizon vector array to straight and level flight, heading north.} for  i := 1 to 36 do
     begin
     horizonA[i][x] := cos(rad(10*i));
     horizonA[i][y] := sin(rad(10*i));
     horizonA[i][z] := 0.0;
     end;

{Rotate horizon vector array to the initial heading, pitch and bank angles.} for  i := 1 to 38 do
     begin
     horizonB[i][x] :=    horizonA[i][x]*cos(heading)*cos(pitch)
                          +horizonA[i][y]*sin(heading)*cos(pitch)
                          -horizonA[i][z]*sin(pitch)
     horizonB[i][y] :=    horizonA[i][x]*(cos(heading)*sin(pitch)*sin(bankr)
                                    - cos(bankr)*sin(heading))
                          +horizonA[i][y]*(sin(heading)*sin(pitch)*sin(bankr)
```

```
                              + cos(bankr)*cos(heading))
                          +horizonA[i][z]*sin(bankr)*cos(pitch);
    horizonB[i][z] :=   horizonA[i][x]*(cos(heading)*sin(pitch)*cos(bankr)
                              + sin(bankr)*sin(heading))
                          +horizonA[i][y]*(sin(heading)*sin(pitch)*cos(bankr)
                              - sin(bankr)*cos(heading))
                          +horizonA[i][z]*cos(bankr)*cos(pitch);
end;

horizonA := horizonB;

{Start Clock} gettime(starthour,startminute,startsecond,startsec100);
starttime := 360000*starthour + 6000*startminute + 100*startsecond+
        startsec100;
time_old := starttime;

{Start Loop.} repeat

{Make control inputs from keypad.
    Determine attitude change from last time through loop.} if   keypressed then
     begin
     ch   := readkey;
     if   ch = #0 then
          begin
          ch := readkey;
          if ch = #80 then elevator := elevator + 0.01
          else if ch = #75 then aileron := aileron - 0.01
          else if ch = #77 then aileron := aileron + 0.01
          else if ch = #72 then elevator := elevator - 0.01
          end
     else if ch = #113 then quit := true;
     end;

{ Determine the nose position drop due to gravity.} gettime(hour,minute,second,sec100);
time_new := hour*360000 + minute*6000 + second*100 + sec100;
deltatime := (time_new - time_old)/100;
time_old := time_new;
Vg := 32.2*deltatime;
ASold := ASnew;
drag := 0.0017*elevator*elevator*ASold*ASold;
ASnew := sqrt(ASold*ASold + Vg*Vg - 2*ASold*Vg*cos(pi/2 - pitch)) - drag;
nosedrop := arccos((ASold*ASold _ ASnew*ASnew - Vg*Vg)/(2*ASold*ASnew));
nosedrop_y := sin(bankr)*nosedrop;
nosedrop_z := cos(bankr)*nosedrop;
VS := ASold*sin(pitch);
ALT := ALT _ VS*deltatime;

{Rotate horizon vector array for the pitch, bank and yaw changes.}
```

```
pc := elevator*deltatime*ASold/591.15 - nosedrop_z;   {Pitch change}
bc := aileron*deltatime*ASold/591.15;
yaw := nosedrop_y;
cosyc := cos(yaw);
cospc := cos(pc);
cosbc := cos(bc);
pc := sin (pc);
bc := sin (bc);
yaw := sin(yaw)

for  i := 1 to 38 do
    begin
    horizonB[i][x] :=      horizonA[i][x]*cosyc*cospc
                           +horizonA[i][y]*yaw*cospc
                           +horizonA[i][z]*pc;
    horizonB[i][y] :=      horizonA[i][x]*(cosyc*pc*bc - cosbc*yaw)
                           + horizonA[i][y]*(yaw*pc*bc + cosbc*cosyc)
                           + horizonA[i][z]*bc*cospc;
    horizonB[i][z] :=      horizonA[i][x]*(cosyc*pc*cosbc - bc*yaw)
                           + horizonA[i][y]*(yaw*pc*cosbc + bc*cosyc)
                           + horizonA[i][z]*cospc*cosbc;
    end
horizonA := horizonB;

{Calculate pitch and bank.} pitch := 1.5708 - arccos(horizonB[38][x];
bankr := -arccos(-horizonB[38][z]/sqrt(sqr(horizonB[38][z])
        + sqr(horizonB[38][y])));  { in radians }
if horizonB[38][y] < 010 then bankr := -bankr;

{Calculate polar coordinate arrays and convert to viewport coordinates.} for  i := 1 to 38 do
    begin
    r[i] := arccos(horizonB[i][x]);
    if    horizonB[i][y] = 0.0 then
          begin
          if    horizonB[i][z] > 0.0 then
                gamma[i] := 1.5708
                else gamma[i] + pi;
          end;
    else
          begin
          gamma[i] := arctan(horizonB[i][z]/horizonB[i][y];
          if    horizonB[i][y] < 0.0 then
                gamma[i] := gamma[i] + pi;
          end;
    screen[i][u] := round(r[i]*cos(gamma[i]*xside/pi + centerx;
    screen[i][v] := round(r[i]*sin(gamma[i]*yside/pi + centery;
    end;

{Fill background in viewport.} if   pitch > 0.06 then setfillstyle(solidfill,darkgray)
     else setfillstyle(solidfill,lightgray);
bar(0,0,round(xside),round(yside));
```

{Draw horizon.}

```
setcolor(white);
setlinestyle(solidln,0,thickwidth);
moveto(screen[36][u],screen[36][v];
for   i := 1 to 36 do
      if horizonB[i][x] > -0.707 then  {Test to see if point is near window.}
          begin
          lineto(screen[i][u],screen[i][v]);
          circle(screen[i][u],screen[i][v],1)
          end
      else
          moveto(screen[i][u],screen[i][v]);
```

{Fill in the ground/sky.}

```
If    pitch < -0.06 then
      begin
      setfillstyle(solidfill,darkgray);
      floodfill(centerx,centery, white)
      end
else
if    pitch > 0.06 then
      begin
      setfillstyle(solidfill,lightgray);
      floodfill(centerx,centery,white)
      end
else
      begin
      setfillstyle(solidfill,darkgray);
      if abs(bankr) < 0.8 then       {Upright}
          floodfill(centerx,centery + 9,white)
      else if abs(bankr) > 2.4 then        {Inverted}
          floodfill(centerx,centery - 9,white)
      else if bankr > 0 then          {45 to 135 deg bank to the right}
          floodfill(centerx + 9,centery,white)
      else       {45 to 135 deg bank to the left}
          floodfill(centerx - 9,centery,white)
      end;
```

{Insert heading numbers.}

```
for   j := 1 to 12 do
      begin
      i := 3*j;
      if (screen[i][u] > fivedegrees) and (screen[i][v] > d=tendegrees)
      then
          outtextxy(screen[i][u],screen[i][v],numstr[j])
      end;
```

{Draw zenith and nadir reference marks.}

```
circle(screen[37][u],screen[37][v],6);
circle(screen[38][u],screen[38][v],2);
setlinestyle(dottedln,0,normwidth);
lineto(screen[37][u],screen[37][v]);
```

{Draw pitch reference marks.}

```
bank := round(deg(bankr));
arc(screen[37][u],screen[37][v],bank+80,bank+100,thirtydeg);
arc(screen[37][u],screen[37][v],bank+80,bank+100,sixtydeg);

arc(screen[38][u],screen[38][v],bank+260,bank+280,sixtydeg);
arc(screen[38][u],screen[38][v],bank+260,bank+280,thirtydeg);

arc(screen[37][u],screen[37][v],bank+87,bank+93,seventydeg);
arc(screen[38][u],screen[38][v],bank+267,bank+273,seventydeg);

arc(screen[37][u],screen[37][v],bank+87,bank+93,eightydeg);
arc(screen[38][u],screen[38][v],bank+267,bank+273,eightydeg);

arc(screen[37][u],screen[37][v],bank+87,bank+93,fortyfivedeg);
arc(screen[38][u],screen[38][v],bank+267,bank+273,fortyfivedeg);
```

{Draw miniature aircraft.}

```
setcolor(yellow);
setLineStyle(solidLn,0,thickwidth);
line(round(4*tendegrees),centery,seventydeg,centery);
line(seventydeg,centery,seventydeg,centery + round(fivedegrees));
line(round(8.9*tendegrees),centery,round(9.1*tendegrees),centery);
line(eightydeg+thirtydeg,centery,2*seventydeg,centery);
line(eightydeg+thirtydeg,centery,eightydeg+thirtydeg,centery
                               + round(fivedegrees));
```

{Draw bank angle reference marks.}

```
setlinestyle(solidln,0,normwidth);
for  i := 1 to 12 do
     begin
     screen[1][u] := round(0.5*cos(rad(i*30))*xside + centerx);
     screen[1][v] := round(0.5*sin(rad(i*30))*yside + centery);
     screen[2][u] := round(0.44444*cos(rad(i*30))*xside + centerx);
     screen[2][v] := round(0.44444*sin(rad(i*30))*yside + centery);
     line(screen[1][u],screen[1][v],screen[2][u],screen[2][v]);
     end;
for  i := 7 to 11 do
if   (i mod 3 ) <> 0 then
     begin
     screen[1][u] := round(0.5*cos(rad(i*10))*xside + centerx);
     screen[1][v] := round(0.5*sin(rad(i*10))*yside + centery);
     screen[2][u] := round(0.47222*cos(rad(i*10))*xside + centerx);
     screen[2][v] := round(0.47222*sin(rad(i*10))*yside + centery);
     line(screen[1][u],screen[1][v],screen[2][u],screen[2][v]);
     end;
for  i := 25 to 29 do
if   (i mod 3) <> 0 then
     begin
     screen[1][u] := round(0.5*cos(rad(i*10))*xside + centerx);
     screen[1][v] := round(0.5*sin(rad(i*10))*yside + centery);
     screen[2][u] := round(0.47222*cos(rad(i*10))*xside + centerx);
     screen[2][v] := round(0.47222*sin(rad(i*10))*yside + centery);
```

```
        line(screen[1][u],screen[1][v],screen[2][u],screen[2][v]);
        end;
for  j := 0 to 3 do
     begin
     i : = 2*j + 1;
     screen[1][u] := round(0.5*cos(rad(i*45))*xside + centerx);
     screen[1][v] := round(0.5*sin(rad(i*45))*yside + centery);
     screen[2][u] := round(0.47222*cos(rad(i*45))*xside + centerx);
     screen[2][v] := round(0.47222*sin(rad(i*45))*yside + centery);
     line(screen[1][u],screen[1][v],screen[2][u],screen[2][v]);
     end;

{Display airspeed, altitude, and vertical velocity.}

ASold := ASold/1.69;
str(ASold:3:0,airspeed);
outtextxy(round(tendegrees),15,airspeed);
str(ALT:5:0,altitude);
outtextxy(centerx + seventydeg,15,altitude);
vs := VS*0.06;
str(VS:4:1,verticalvel);
outtextxy(centerx + seventydeg,25,verticalvel);

{Change pages.} if   flag then
     begin
     visualpage := 1;
     activepage := 0;
     end
else
     begin
     visualpage := 0;
     activepage := 1;
     end;
flag := not(flag);
setvisualpage(visualpage);
setactivepage(activepage);
counter := counter + 1;

{Return to start of loop.} until quit;

gettime(hour,minute,second,sec100);
time := 360000*hour + 6000*minute + 100*second +sec100;
speed := 100*countr/(time - starttime);

readln;
closeGraph;
writeln('Speed is':8, speed:8:3,' frames per second.':12);
end.
```

I claim:

1. Electronic attitude display apparatus for an aircraft comprising the combination of:
   electrically operated blank screen means for generating a plurality of human viewable optically contrasting images;
   means for representing said aircraft as a first predetermined optical image symbol on said blank screen means;
   means for representing a sky-to-earth junction horizon on said blank screen means by a second predetermined optical image symbol viewable in conjunction with said first optical image symbol;
   said second predetermined optical image symbol having a straight line first characteristic shape in response to said aircraft being in a horizontal pitch attitude, a low in the center and high at each end curving second characteristic shape in response to said aircraft being in a nose-up pitch attitude, and a high in the center and low at each end curving third characteristic shape in response to said aircraft being in a nose-down pitch attitude;
   said second and third characteristic shapes varying in proportion to degree of nose-up and nose-down pitch attitude respectively of said aircraft;
   relative positioning of said first and second predetermined optical image symbols being responsive to roll and pitch attitudes of said aircraft.

2. The apparatus of claim 1 wherein said second and third characteristic shapes include an increasing degree of curvature response to increasing angles of upward and downward pitch angle of said aircraft.

3. The apparatus of claim 2 wherein said second and third characteristic shapes include a first circular pattern image sky related response to a ninety degree nose-up pitch attitude of said aircraft and a second circular pattern image earth related response to a ninety degree nose-down pitch attitude of said aircraft.

4. The apparatus of claim 3 wherein said first circular pattern image and said second circular pattern image comprise images of different optical shading.

5. The apparatus of claim 4 wherein said different optical shadings include a difference in one of the characteristics of hue, saturation, and brightness.

6. The apparatus of claim 5 wherein said blank screen means comprises one of a cathode ray tube, a light emitting diode array, a liquid crystal display, and a fiber optic bundle matrix.

7. The apparatus of claim 6 wherein said first predetermined optical image symbol includes oppositely disposed arm portions visually suggestive of aircraft wings.

8. The method for illustrating the attitude of an aircraft in a display apparatus comprising the steps of:
   representing said aircraft with a first predetermined symbol in an optical image generated by said display apparatus; and
   depicting a sky-to-earth junction horizon with a second predetermined symbol which includes a straight line first configuration response to a horizontal pitch attitude of said aircraft, a low in the center and upward curving second configuration response to nose-up pitch attitudes of said aircraft, and a high in the center and downward curving third configuration response to nose-down pitch attitudes of said aircraft, with the degree of curvature in said second and third configurations being responsive to pitch angle of said aircraft and including first and second full circle horizon related second symbol curvature configurations, respectively for pitch angles of ninety degrees nose up and ninety degrees nose down;
   said pitch attitude of said aircraft and also a roll attitude of said aircraft being additionally depicted by relative positioning of said first and second predetermined symbols.

9. The method of claim 8 wherein said display includes optically contrasting shadings of optical image portions above and below said second symbol horizon configurations and within and without each of said first and second full circle horizon related symbols.

10. The method of claim 9 wherein said optically contrasting shadings include contrasts in one of the characteristics of hue, saturation, and brightness.

11. The method of claim 10 further including the step of incorporating in said optical image additional flight related data concerning said aircraft.

* * * * *

UNITED STATES PATENT AND TRADEMARK OFFICE
CERTIFICATE OF CORRECTION

PATENT NO. : 5,198,812
DATED : March 30, 1993
INVENTOR(S) : Andrew A. Probert

It is certified that error appears in the above-identified patent and that said Letters Patent is hereby corrected as shown below:

Column 5, line 19, "such" should be deleted.

Column 5, line 60, "displacement" should be --displacements--.

Column 5, line 63, "angular" should be deleted.

Column 9, line 34 (equation 11), "(chsps" should be --(chspsb--.

Column 10, line 60, "aircraft s" should be --aircraft's--.

Column 10, line 65, "him" should be deleted.

Signed and Sealed this

Eighth Day of March, 1994

Attest:

BRUCE LEHMAN

*Attesting Officer*     *Commissioner of Patents and Trademarks*